July 11, 1950      L. DEWAN      2,514,990
ARC-WELDING MASK
Filed Nov. 3, 1945      4 Sheets-Sheet 1
FIG. 1
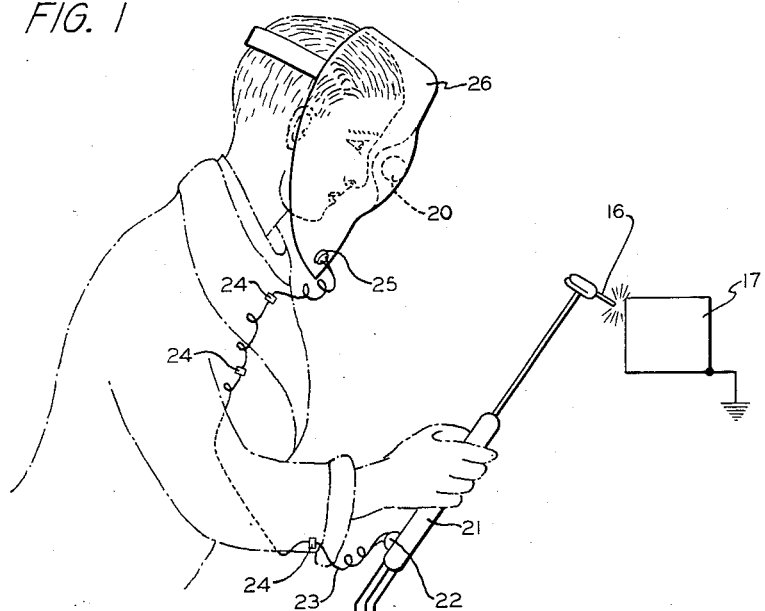
FIG. 2
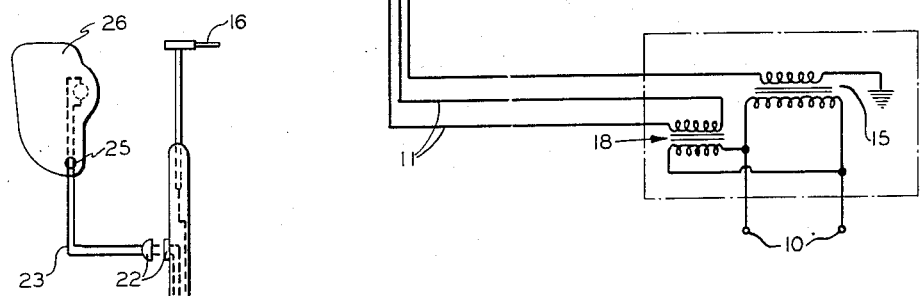
FIG. 7
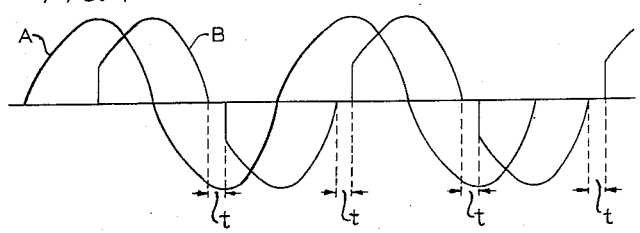
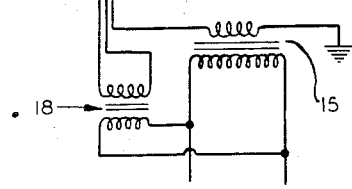
INVENTOR.
LEON DEWAN
BY Mueller, Dodds & Mason
ATTORNEY July 11, 1950          L. DEWAN          2,514,990
ARC-WELDING MASK
Filed Nov. 3, 1945          4 Sheets-Sheet 2
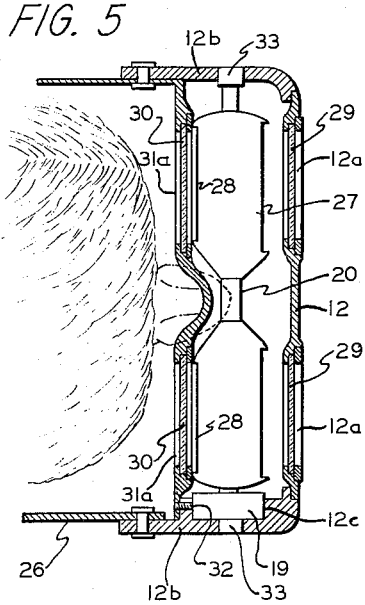
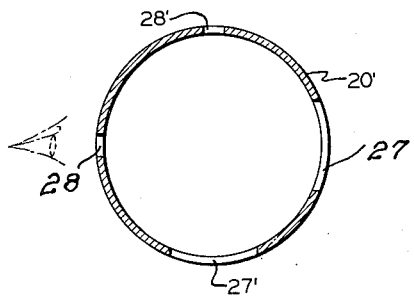
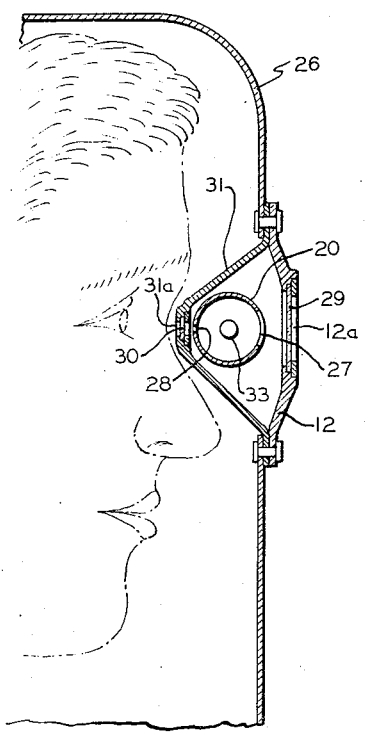
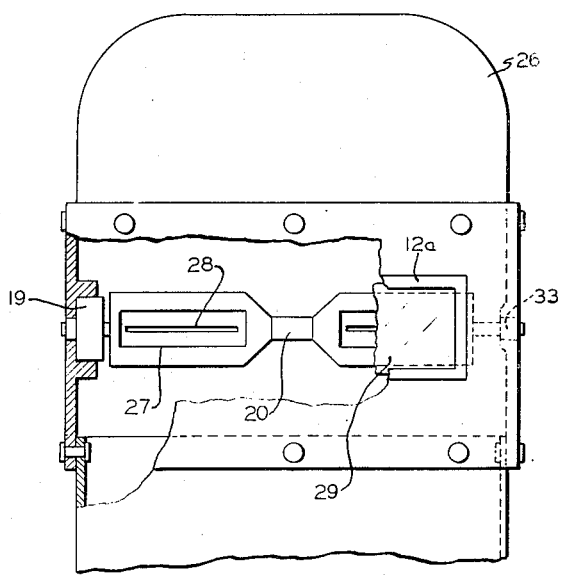
*INVENTOR.*
LEON DEWAN
BY Mueller, Dodds & Mason
ATTORNEY July 11, 1950  L. DEWAN  2,514,990
ARC-WELDING MASK
Filed Nov. 3, 1945  4 Sheets-Sheet 3
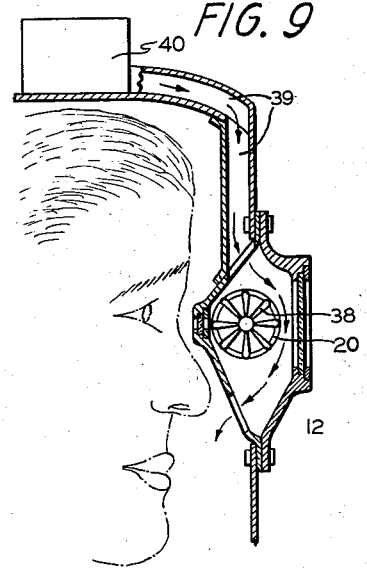
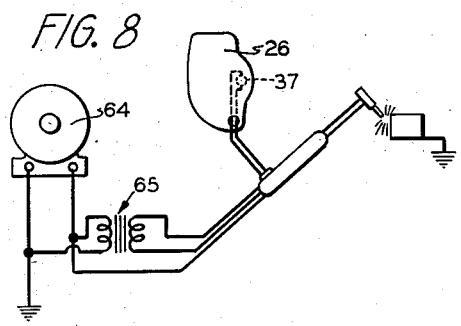
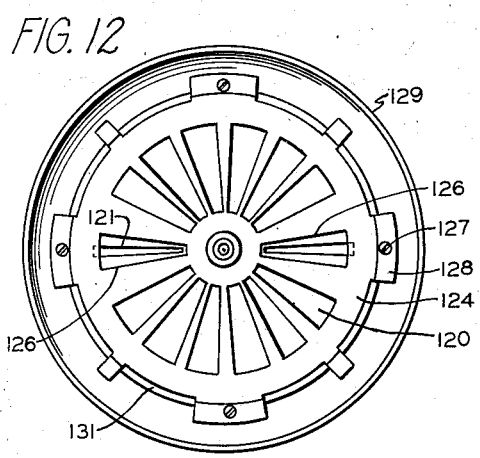
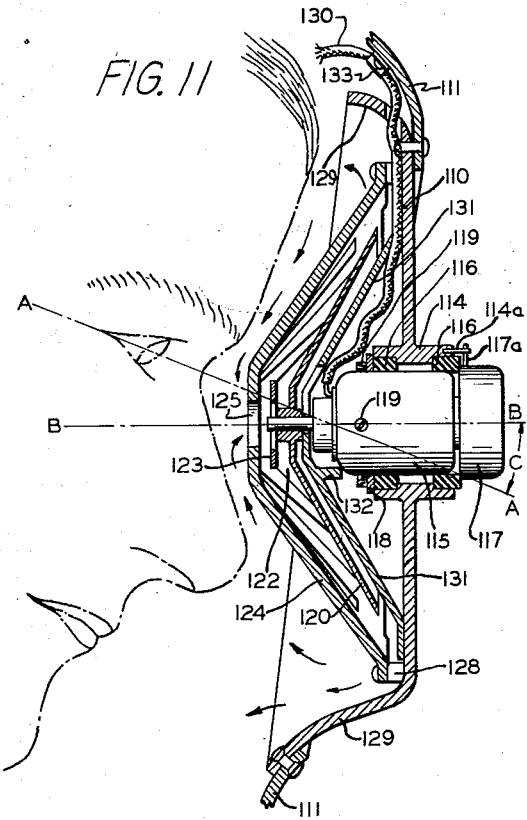
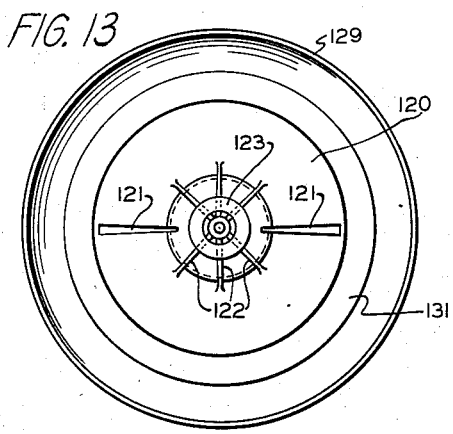
INVENTOR.
LEON DEWAN
BY Mueller, Dodds & Mason
ATTORNEY July 11, 1950 L. DEWAN 2,514,990
ARC-WELDING MASK
Filed Nov. 3, 1945 4 Sheets-Sheet 4
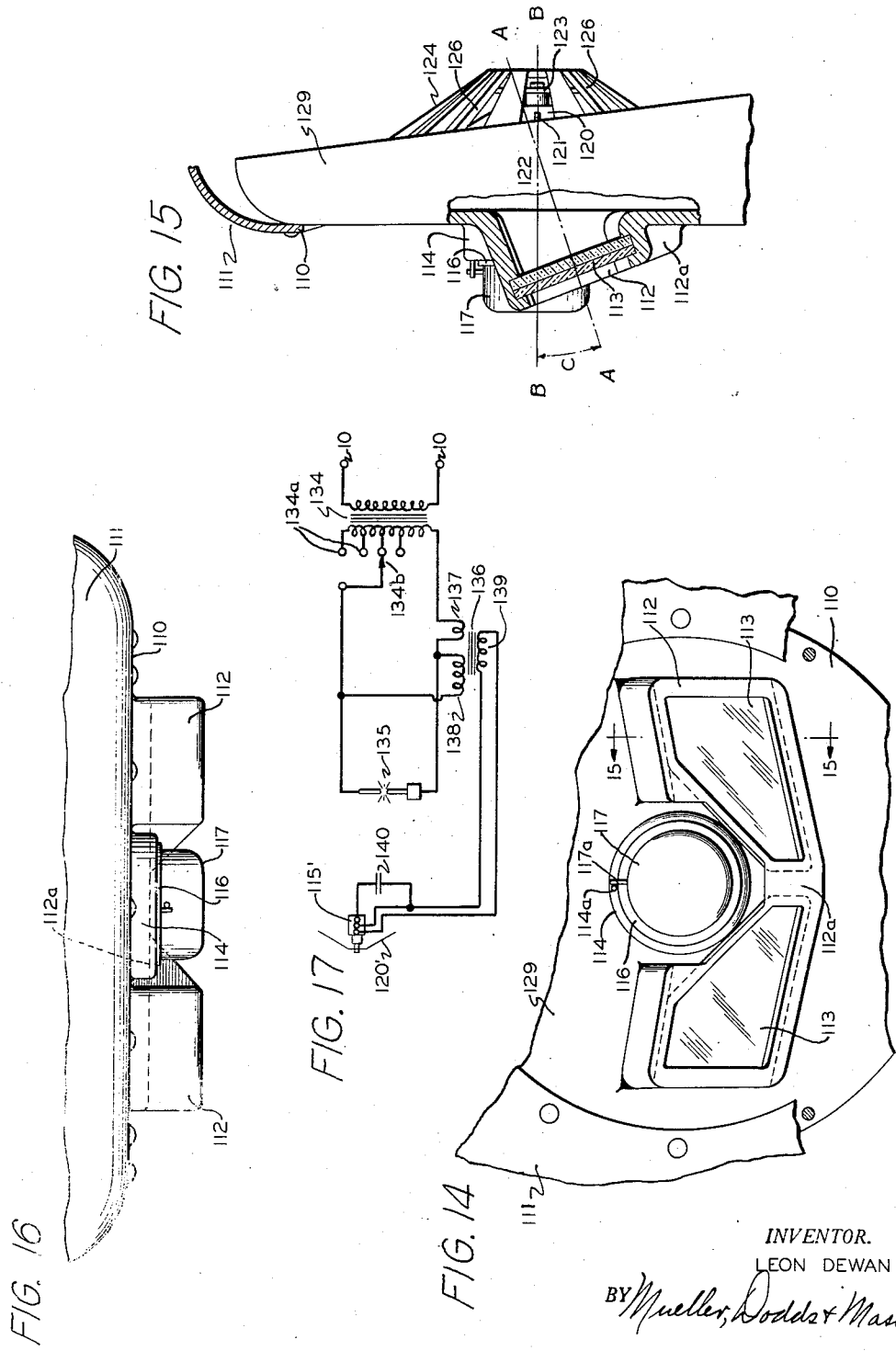
INVENTOR.
LEON DEWAN
BY Mueller, Dodds & Mason
ATTORNEY Patented July 11, 1950

2,514,990

UNITED STATES PATENT OFFICE 2,514,990

ARC-WELDING MASK

Leon Dewan, New York, N. Y., assignor of one-half to Percival W. Andrews, New York, N. Y.

Application November 3, 1945, Serial No. 626,492

20 Claims. (Cl. 2—8)

This invention relates to arc-welding masks and particularly to such masks of the type including a continuously movable shutter and provisions enabling the operator to adjust the phase of the shutter movement to limit the vision of the work to any desired portion of the welding cycle.

This application is a continuation-in-part of my copending applications Serial No. 529,304, filed April 3, 1944, and Serial No. 578,135, filed February 16, 1945, each entitled "Safety Devices for Electrical Arc Welding," and both of which have become abandoned.

Heretofore welding masks or helmets for use with arc-welding systems have generally comprised a hood-like opaque shield to protect the operator, the shield having a pair of viewing apertures in which are mounted a pair of heavy filter glasses to absorb and protect the eyes of the operator from the intense and injurious visible and ultra-violet light emanating from the arc. This type of welding mask has a number of disadvantages. For example, the filter glasses of sufficient absorptive properties properly to protect the operator are quite heavy, making the helmet cumbersome and tiring in use. A more important disadvantage is that, if the filter has sufficient absorptive properties to protect the eyes of the operator properly, he is unable to see the work adequately, particularly when commencing and ending a welding operation. This last effect causes fatigue of the operator due to the sharp contrast between the alternating intense light of the arc and the relative intense darkness during the short intervals when the arc is extinguished. As a result, the designs of such welding masks have usually been a compromise, providing a partial protection of the eyes of the operator and a partial visibility of the work. Even when utilizing this compromise design, however, the welding operation has been an exacting one in which the operator has required a large percentage of time for resting his eyes from the fatigue described above and for putting on and taking off the mask to view the work before and after each completed welding step.

While there have been proposed certain welding masks which include rotating shutters and cooperating viewing apertures to limit the view of the work to a fraction of the total cycle of the welding current, these masks have not found their way into commercial use, both because they have been cumbersome and impracticable in construction and because they have included no provisions for maintaining the shutter rotation in proper phase with respect to the arc current.

It is an object of the invention, therefore, to provide a new and improved arc-welding mask of the type described which is simple, compact and of light-weight construction, utilizing a filter glass which is only a fraction as absorptive as the prior art filters.

It is another object of the invention to provide a new and improved arc-welding mask of the type described in which the operator has an adequate view of the work both prior to, during and after each welding operation.

It is another object of the invention to provide a new and improved arc-welding mask of the type described in which a view of the work is afforded only during an extremely small fraction of each cycle of welding current while at the same time providing the operator with a relatively wide viewing angle.

It is another object of the invention to provide a new and improved arc-welding mask of the type embodying a movable shutter in which the phase of the shutter motion may be adjusted to maintain it in proper phase with the arc current.

It is a further object of the invention to provide a new and improved arc-welding mask of the type described in which the tendency of the shutter motor to pull out of synchronism upon sudden changes in the welding current is substantially eliminated.

It is another object of the invention to provide a new and improved arc-welding helmet of the type described in which there is included means for circulating cooling and ventilating air through the helmet during use.

In accordance with the invention, a mask for use with an electric arc-welding system energized from a source of periodic current comprises an opaque shielding member having a viewing aperture and a shutter having an aperture registering with the viewing aperture. The mask also includes synchronous motor means adapted to be energized from the source and connected to drive the shutter and means for adjusting the phase of the shutter motion with respect to the potential of the source.

Further in accordance with the invention, a helmet for use with an electric arc-welding system energized from a source of periodic current comprises an opaque shielding member having a viewing aperture and a shutter having an aperture registering with the viewing aperture. The helmet also includes synchronous motor means adapted to be energized from the source and connected to drive the shutter means and air-circulating means within the helmet and driven by the motor means.

Referring now to the drawings, Fig. 1 is a side view of a person operating a welding tool with my improved arc-welding mask in position on his head.

Fig. 2 is a diagram of an electric circuit adapted for use with my improved device.

Fig. 3 is an enlarged detail front view of the mask of Fig. 1 embodying my invention shown partly in section and partly broken away for the sake of clarity.

Fig. 4 is a longitudinal sectional view of the device of Fig. 3.

Fig. 5 is a transverse sectional view of the device of Fig. 3.

Fig. 6 is an enlarged sectional view of a modified form of shutter device suitable for use in the mask of Fig. 3.

Fig. 7 is a graph representing the periodic arc current.

Fig. 8 is a schematic circuit diagram of a system operating on pulsating direct current.

Fig. 9 is a longitudinal sectional view of a modified form of arc-welding mask in position on the head.

Fig. 10 is a graph of the pulsating direct current used in the system of Fig. 8.

Fig. 11 is a cross-sectional view of an improved type of arc-welding mask embodying the invention.

Fig. 12 is an elevational view of the shutter and guard of the mask of Fig. 11.

Fig. 13 is an elevational view of the rotary shutter of the mask of Fig. 11.

Fig. 14 is a fragmentary front view of the mask of Fig. 11.

Fig. 15 is a longitudinal sectional view on the plane of the line 15—15 of Fig. 14.

Fig. 16 is a top plan view of the mask of Fig. 11.

Fig. 17 is a circuit diagram of a modified motor supply circuit.

Referring now to Figs. 1–5, inc., of the drawings, there is represented an electric arc-welding system energized from a source of periodic current, such as terminals 10, which may be a commercial 60-cycle 110-volt circuit. The welding system comprises a welding transformer 15 connected to terminals 10 and supplying an alternating current to a welding electrode 16 and a workpiece 17 between which an arc is struck. A small transformer 18 connected to the terminals 10 energizes a small motor in the welding mask, described hereinafter. The secondary winding of transformer 18 is connected to a line 11 which runs alongside the welding conductor and connects through a handle 21 of the welding electrode holder to a miniature plug connector 22 which, in turn, is connected to a flexible insulated line 23 attached to the operator's sleeve and jacket by means of pins 24 and leads to a second miniature plug connector 25 attached to the mask.

Referring particularly to Figs. 3, 4 and 5 of the drawings, the mask comprises an opaque shielding member having a viewing aperture, specifically a masking member or hood 26 of suitable material such as pressed fiber and a supporting plate or member 12 having a pair of windows or apertures 12a in which are disposed nonsplatter glasses 29. The mask also includes an elongated shutter disposed inside the shielding member 26 and rotatable about its longitudinal axis, which is transverse to the lines of sight of the operator. The shutter has a pair of diametrically opposed apertures individually and simultaneously registering with the viewing apertures 12a, 12a. This shutter may be in the form of a cylindrical drum or barrel-shaped shutter 20 having axially spaced portions in front of the two eyes of the operator, each portion having a pair of opposed peripheral slots registering, in one position of the shutter, with one of the viewing apertures 12a. Each pair of shutter apertures comprises a wide slot 27 and a narrow slot 28. The shutter 20 may be of Duralumin and may be supported at its opposite ends in bearings 33 mounted in rearwardly extending flanges 12b, 12b of the supporting member 12.

The mask also includes motor means 19 having a stator or frame mounted or set in a circular recess 12c in one of the end flanges 12b of the supporting plate 12 and connected to be energized from the welding current source, as described above. The rotor of motor 19 is connected to drive the shutter 20 while the stator or frame is adjustable about the axis of rotation; that is, it can be turned in the recess 12c to adjust the phase of the shutter motion with respect to the potential of the supply terminals 10. The motor 19 may be of any suitable synchronous type but is preferably self-starting. The motor frame may be fastened or secured in any desired position by means of a set screw 32.

The mask also includes a guard member 31 enclosing the shutter and isolating it from the face of the operator and provided with a pair of apertures 31a individually registering with the viewing apertures 12a. The apertures 31a may be fitted with pieces of filter glass 30 of a much lighter shade than those conventionally used in arc-welding helmets.

The operation of the arc-welding mask of the invention is predicated on the fact that a welding arc, when fed from a 60-cycle alternating-current line, is extinguished for brief intervals 120 times per second. If the work can be viewed only during these brief intervals when the arc is extinguished or during closely adjacent periods of relatively low arc intensities, the period of retentivity of the eye is such that the view of the work piece appears continuous, the work being illuminated by the external light on the work, the molten metal and a faint light from the arc in case the viewing exposure extends beyond the periods of arc extinction. Therefore, by providing the welder with a mask having a shutter which exposes the work only during the intervals of arc extinction, the mask may utilize very light filter glasses while at the same time avoiding eyestrain and fatigue of the operator. However, during the welding operation, the arc is generally fed through a high-reactance transformer and it is customary to vary the welding current in accordance with the nature of the work and the nature of the weld being formed. In such systems, variations of the welding current cause wide variations in the phase of the welding current relative to the potential of the supply circuit.

Conditions for one value of welding current are represented in the graph of Fig. 7 in which curve A represents the potential of a conventional 60-cycle supply circuit such as terminals 10, while curve B represents the welding current, which lags the supply potential by a considerable angle. Due to the fact that it takes a finite voltage to restrike the arc on each reversal of current, there is an interval $t$, between the extinction of the arc at the end of each half-cycle and the restriking of the arc with the opposite polarity during the succeeding half-cycle, during which the arc is extinguished. By viewing the arc only during the intervals $t$, or periods closely adjacent thereto when the arc is relatively less intense, the operator has an apparently continuous view of the work which is illuminated at only moderate intensity, requiring the use of only light filter glasses. Also, due to the fact that the work is exposed to view during only a small fraction of the cycle and due to the averaging action of the eye, the apparent illumination of the work is only such fraction of the actual illumination during the periods $t$.

It is believed that the operation of the welding mask of Figs. 1-5, inc., to procure the results described will be apparent from the foregoing description. In brief, with the mask in place on the operator's head, the motor 19 and shutter 20 are put into operation by connection of the plugs 22 and 25. The operator then strikes an arc between the welding electrode 16 and work piece 17 and performs the desired welding operation. At the same time, the stator or frame of the motor 19 is adjusted by suitable means (not shown) until the operator's view is confined to the periods $t$ when the arc is extinguished or to so much of the adjacent periods as is required to give the desired illumination of the work. The motor is then secured or retained in this position by means of the set screw 32. In case the nature of the work or the weld is changed, requiring an adjustment of the welding current, the motor 19 is readjusted in its angular position to maintain the desired view of the work, that is, to maintain the desired phase relation between the shutter motion and the potential of the supply terminals 10.

During the welding operation with the motor adjusted as described, once during each revolution of the shutter 20, the shutter apertures 27 and 28 align with the apertures 31a in the guard 31 and the viewing apertures 12a in the supporting plate 12 and permit a momentary view of the work as described. By making all of the apertures, except one of the shutter apertures of each pair, several times the width of such shutter apertures, the duration of the viewing interval during each cycle may be given a desired small value without unduly restricting the angle of vision. To this end, the widths of the apertures 31a, 12a and 27 are made several times that of the shutter apertures 28.

To get a view at each and every zero period when using a 60-cycle alternating welding current, the motor 19 would have to run at 3600 R. P. M. However a motor of 1800 R. P. M. may be used with a shutter 20′ having two cylindrical portions, each formed with two pairs of apertures or slots, wide apertures 27 and 27′ and narrow apertures 28 and 28′, spaced 90° apart, to produce the same result, as shown in Fig. 6. A motor of a fraction of this speed, such as 900 R. P. M. can also be used, although in this case a view will be obtained only at alternate zero-current periods.

Although alternating-current arc welding is increasingly used, there still remain cases in which direct-current welding is preferred. To apply the welding mask of the present invention to a direct-current welding system, it is necessary that the current be pulsating or intermittent, such as an unfiltered rectified alternating current or current developed by generators especially designed to generate current of a similar wave form. Fig. 10 illustrates the wave form of such a current, while Fig. 8 is a schematic circuit diagram of a welding system operating on such a current. This system includes a generator 64 producing a current of the wave form of Fig. 10 and a transformer 65 for deriving from the pulsating direct current an alternating current for operating a synchronous shutter motor 37 in the mask 26. Alternatively, the motor 37 could be operated from a small alternating-current generator coupled to generator 64.

In the modified form of welding mask shown in Fig. 9, the masking member 26 is in the form of a helmet and there is provided air-circulating means within the helmet and driven by the motor 19 for drawing air into the helmet together with air filter means interposed in the air inlet path. Specifically, fan blades 38 are formed on one end of the shutter 20 so that, as it rotates, air is circulated through the helmet 26 downwardly past the nose and mouth and outwardly at the bottom of the helmet, thereby expelling noxious gases from the welding arc. The air may enter the chamber through ducts 39 leading from a filter 40 at the top and rear of the helmet 26 which is adapted to purify the circulated air.

Where external light is directed upon the work by electric lamps, particularly of the fluorescent type, it is desirable that the phase of current supplied to these lamps be displaced 90° in phase from that of the arc current so that the external illumination reaches its peak at the arc zero periods when the work is exposed to view, so that maximum visibility is secured with least arc glare.

Referring now to Figs. 11-16, inc., of the drawings, there is illustrated a preferred form of welding mask embodying the invention. This mask comprises a supporting face plate 110, preferably of a molded plastic, riveted to the shielding member 111 which is in the form of a hood or helmet and which may be of fiber and in which is formed a circular hole to admit the face plate 110. The face plate is molded to include viewing apertures or windows 112 with recesses to hold filter glasses 113 inserted from either side. The shutter motor stator is frictionally mounted from the supporting plate 110 and is adjustable to adjust the phase of the shutter motion with respect to the potential of the source. To this end the plate 110 is provided with a cylindrical hub portion 114 in which the motor 115 is mounted. Frictional rubber supporting rings 116 for motor 115 are held in circular recesses at either end of the portion 114 by a knob 117 at one end and by the fiber washer 118 at the other end. The knob 117 is secured to one end of the frame of motor 115 and is preferably provided with a serrated surface or equivalent friction grip. Screws 119 in the motor hold the washer 118 in place against the adjacent rubber ring. The stator or frame of the motor may be turned in the rings 116 by the knob 117 for phase adjustment, cooperating stops 114a and 117a limiting such adjustment.

In this form of welding mask, the shutter is conoidal and convex inwardly to conform approximately to the physiognomy of the operator. Specifically, a conoidal shutter 120 is mounted on the shaft of motor 115 and has two narrow viewing apertures 121 extending radially from the edge of a flat truncated central portion to within a short distance of its periphery. The apertures have radial boundaries and may be of a width of from 1/8" to 3/16" where the line of sight of each eye passes through an aperture. The shutter 120 is preferably of aluminum and formed with a plurality of radially extending stiffening members or ribs 122 which constitute a centrifugal fan or blower for circulating air within the helmet. These ribs are partly covered by a thin flat ring 123 which assists in the blower action. The helmet also includes a conoidal guard member 124 closely enclosing the conoidal shutter 120 for protecting the face of the operator therefrom. This guard 124 may be of molded plastic with a central hole 125 for admitting air to the blower. The guard 124 is provided with a pair of diametrically opposed apertures 126 registering with the viewing apertures 112 and defining the field of vision. The apertures 126 may have a width two or three times the width of the shutter apertures 121 while the viewing apertures 112 also are of a width several times that of the shutter apertures. Other openings in the guard member 124 permit air to circulate freely from the shutter surface and over the face of the operator. The guard 124 may be attached by screws 127 to bosses or blocks 128 molded on the face plate 110.

The face plate 110 is formed with a curved rim 129 of such configuration that the air centrifugally impelled by the shutter blower is deflected toward the face of the operator. As shown by the arrows in Fig. 11, a large portion of this air returns by suction to the center of the shutter 120 for recirculation.

The lead wires 130 from the motor 115 are prevented from touching the revolving shutter 120 by means of a guard 131 which is cemented or otherwise secured to the face plate 110. This guard is of a generally conical form but it is mostly open, leaving one supporting part on the lower side and a sector on the upper side between the lead wires and the shutter. The central portion of this guard 131 is provided with an arcuate flange 132 which partially surrounds the connection end of motor 115 and prevents the wires 130 from projecting beyond the end of the motor and in front of the shutter apertures 121 at the sides but is apertured at the top to permit exit of the wires 130. The rim 129 has an aperture at the top to allow the wires 130 to emerge, beyond which they are fastened at 133 on their way out of the helmet.

The motor 115 and shutter 120 have a common axis due to the mounting of the shutter on the motor shaft. This axis is represented by the trace B—B of Figs. 11 and 15. The lines of sight of the operator to the work, are represented by the trace A—A, and are preferably inclined slightly upwardly and away from the mask by an angle C, as illustrated. The shutter and motor axis is disposed midway or symmetrically between the lines of sight of the operator. The advantage in inclining this axis lies in the fact that, with this arrangement, the forward portion of the motor interferes to a minimum degree with the cones of vision from the eyes of the operator so that the maximum working area may be seen by both eyes of the operator.

Another advantage of inclining the motor and shutter axis and making the shutter 120 and guard 124 conoidal is that the guard apertures 126 may be brought nearer to the eye to increase the viewing angle. This inclination of the axis combined with the conical form of the shutter 120 and guard 124 permits the least spacing between the guard apertures 126 and the eyes of the operator, since these elements conform closely to the physiognomy of the operator, that is, to the angle formed by the brow and nose of the average face. The conical form of the shutter 120 together with the radial boundaries of the guard apertures 126 cause the viewing angle to be substantially uniform from end to end of the apertures. The vertical width of the viewing apertures 112 is greater than, preferably several times, the diameter of the cones of view from the eye of the operator. This allows for variations in positions of the eyes of different welding operators relative to the guard apertures 126 so that the cones of view always pass through the viewing apertures 112 even if the cones of view swing up and down, thereby providing a relatively wide angle of vision.

Since the guard apertures 126 are much wider than the shutter aperture 121, the field of vision is much wider than if they were of the same size. While this causes a slight difference in phase of the view relative to the cycle of welding current when sighting through the upper part than through the lower part of the guard apertures 126, it has been found that a welding operator tends to direct his sight through one part of the apertures as he works and, therefore, if he has adjusted the phase for the job at hand by means of knob 117, that adjustment will remain correct for that job. If desired, a marker such as a horizontal hairline across the glass 113 or a slightly unshaded area at the center of the glass may be used as a guide for the welder to keep the arc sighted through a constant plane of the viewing apertures.

The configuration of the rim 129 of the supporting plate 110 forces most of the air centrifugally impelled from the shutter blower to circulate within the helmet space to cool the face of the operator and prevent fogging of eye-glasses or the glasses 113. As shown in Fig. 11 by the arrows, the air returns to the suction region at the center to be recirculated. If the air were allowed to blow freely out of the helmet, outside air would flow in to replace this and possibly carry fumes into the interior.

Fig. 17 is a circuit diagram of a modified arc-welding system including means for modifying the energization of the motor means directly in accordance with variations in the arc current to stabilize the motor means. This system comprises a main power transformer 134 having a primary winding connected to the supply terminals 110 and a secondary winding provided with a series of taps 134a and an adjustable contact 134b for adjusting the value of the welding current. The welding electrodes 135 are energized from an adjustable portion of the secondary winding of transformer 134. In this system the shutter motor 115' having a shutter 120' mounted on its shaft is energized from the circuit through a transformer 136 having a primary winding 138 connected across the welding circuit and a secondary winding 139 connected to one phase winding of the motor 115'. The motor 115' may be a conventional two-phase type having its second phase winding excited from the transformer 136 through a phase-shifting condenser 140. The transformer 136 is also provided with a compensating winding 137 connected in series in the welding circuit. The general operation of the arc-welding system of Fig. 17 is similar to that of Fig. 1 described above. However, the addition of the compensating winding 137 to the transformer supplying the shutter motor is effective to supply a component of excitation to the shutter motor varying with the value of arc current. As a result, any sudden surges of welding current which might occur due to rapid changes in the impedance of the welding circuit, as might be occasioned by accidental momentary short-circuiting of the welding electrodes, which surges would momentarily reduce the secondary voltage and thus the excitation of the motor 115′, simultaneously supplies a component of excitation to the motor through the winding 137. This action tends to prevent the synchronous motor 115′ from dropping out of synchronism upon the occurrence of sudden surges in the welding circuit. This tendency of motor 115′ to pull out of synchronism is accentuated by the fact that it is made as small as possible in order to limit the weight which it adds to the welding helmet. It has also been found that the provision of the compensating winding 137, excited directly by the arc current itself, is effective automatically to maintain the rotation of the shutter 120′ in phase with the pulsations of the arc current so that, once the shutter motor 115′ is set in its proper phase relation, further adjustment thereof with adjustment of the taps of the welding transformer 134 may be minimized or even eliminated.

As stated above, ordinarily the phase relation between the primary potential and the secondary current of an arc-welding transformer varies as the transformer is adjusted for different welding currents. If the shutter motor is energized directly from the primary or supply circuit, this change of phase affects the relation between the viewing periods and the periods of arc extinction so that the viewing periods may shift from the periods of zero arc current and readjustment of the shutter phase is required. However, by the use of the welding masks of the invention, the shutter viewing periods may readily be maintained in phase with the periods of arc extinction.

While there have been described what are at present considered to be the preferred embodiments of the invention, it will be apparent to those skilled in the art that various changes and modifications may be made therein without departing from the spirit or scope of the invention.

I claim:

1. A mask for a welding system comprising an outer shield having a viewing aperture, a rotary apertured shutter within said shield, said shutter transmitting a view through the shield aperture but limiting exposure to light, blade means associated with said shutter for circulating air in the shield and motor means for driving said shutter.

2. A mask for a welding system comprising a shield having a viewing aperture, a rotary air circulating member within said shield, for disposition frontally of the face of the welding operator, motor means for driving said rotary member, and means associated with said member for viewing through said member and the shield aperture and limiting time exposure to light.

3. A mask for an arc welding system including a shield having a viewing aperture, a rotary shutter within said shield, motor means for driving said shutter, said shutter having elongated viewing apertures therein periodically registrable with said shield aperture whereby time exposure to the arc light is limited, the apertures being disposed substantially radially of said shutter whereby small time exposure is obtained of the arc with a relatively wide field of vision.

4. A helmet for use with an electric arc-welding system energized from a source of periodic current comprising, an opaque shielding member having a viewing aperture, a shutter having an aperture registering with said viewing aperture, synchronous motor means adapted to be energized from said source and connected to drive said shutter means, and air-circulating means within the helmet and driven by said motor means.

5. A helmet for use with an electric arc-welding system energized from a source of periodic current comprising, an opaque shielding member having a viewing aperture, a shutter having an aperture registering with said viewing aperture, and synchronous motor means adapted to be energized from said source and connected to drive said shutter means, said shutter being provided with radially extending stiffening members constituting means for circulating air within said helmet.

6. A helmet for use with an electric arc-welding system energized from a source of periodic current comprising, an opaque shielding member having a viewing aperture, a shutter having an aperture registering with said viewing aperture, synchronous motor means adapted to be energized from said source and connected to drive said shutter means, air-circulating means within the helmet and driven by said motor means for drawing air into the helmet, and air-filter means interposed in the air inlet path.

7. A mask for use with an electric arc-welding system comprising, an outer hood adapted to be disposed in front of the face of an operator, an outer transparent eyepiece, a continuously rotatable shutter having opaque portions for shutting off the view and open portions for exposing the view in rapid succession, said shutter being positioned inside the outer eyepiece, and a guard member inside the shutter for protecting the face of the operator.

8. A mask for use with an electric arc-welding system energized from a source of periodic current comprising, an opaque shielding member having a viewing aperture, a shutter having an aperture registering with said viewing aperture, synchronous motor means adapted to be energized from said source and connected to drive said shutter, and means for modifying the energization of the motor means directly in accordance with variations in the arc current to stabilize said motor means.

9. A mask for use with an electric arc-welding system energized from a source of periodic current comprising, an opaque shielding member having a viewing aperture, a rotatable shutter having an aperture registering with said viewing aperture, synchronous motor means connected to drive said shutter, and means for energizing said motor means directly from the arc circuit to maintain the shutter rotation substantially in phase with the arc current.

10. A mask for use with an electric arc-welding system energized from a source of periodic current comprising, an opaque shielding member having a viewing aperture, a rotatable shutter having an aperture registering with said viewing aperture, and synchronous motor means connected to drive said shutter, said motor means having a winding adapted to be connected effectively in series with the arc circuit to maintain the shutter rotation substantially in phase with the arc current.

11. A mask for use with an electric arc-welding system energized from a source of periodic current comprising, an opaque shielding member having a viewing aperture, a rotatable shutter having an aperture registering with said viewing aperture, and synchronous motor means adapted to be energized from said source and connected to drive said shutter, said motor means having a first winding adapted to be energized effectively across the arc circuit and a second winding adapted to be connected effectively in series with the arc circuit to stabilize the motor means under variable welding circuit conditions and to maintain the shutter rotation substantially in phase with the arc current.

12. A mask for use with an electric arc-welding system energized from a source of current comprising, an opaque shielding member having a viewing aperture, a shutter positioned within said shielding member and having an aperture registering with said viewing aperture in the shielding member whereby the arc may be viewed and exposure thereto be constantly limited, motor means adapted to be continuously energized from said source during operation of the welding system and connected to drive said shutter, said motor means and said shutter having a common axis between the lines of sight of the operator.

13. A mask for use with an electric arc-welding system energized from a source of current comprising, an opaque shielding member having a viewing aperture, a rotary shutter having an aperture registering with said viewing aperture in the shielding member whereby the arc may be viewed and exposure thereto be constantly limited, said viewing aperture having a width several times that of said shutter aperture, thereby providing a relatively narrow viewing angle within a relatively wide angle of vision, and motor means adapted to be energized from said source and connected to drive said shutter.

14. A mask for use with an electric arc-welding system energized from a source of periodic current comprising, an opaque shielding member, a shutter disposed inside said shielding member and having an aperture, synchronous motor means adapted to be energized from said source and connected to drive said shutter, and a guard member disposed between said shutter and the face of the operator having a viewing aperture registering with said shutter aperture and of a width several times that of said shutter aperture.

15. A mask for use with an electric arc-welding system energized from a source of current comprising, an opaque shielding member having a viewing aperture, a conoidal shutter convex inwardly to conform approximately to the physiognomy of the operator and having an aperture registrable with said viewing aperture in the shielding member whereby the arc may be viewed and exposure thereto be constantly limited, and motor means adapted to be energized from said source and connected to drive said shutter.

16. A mask for use with an electric arc-welding system energized from a source of periodic current comprising, an opaque shielding member having a viewing aperture, a conoidal shutter convex inwardly to conform approximately to the physiognomy of the operator and having an aperture registering with said viewing aperture, said shutter being disposed inside said shielding member, synchronous motor means adapted to be energized from said source and connected to drive said shutter, and a conoidal guard member disposed between the face of the operator and said shutter and having an aperture registering with said viewing aperture.

17. A mask for use with an electric arc-welding system energized from a source of current comprising, an opaque shielding member having a pair of viewing apertures, a rotatable shutter enclosed within said shielding member and disposed to rotate transverse to the lines of sight and having a pair of apertures disposed at opposite sides of the axis of rotation of said shutter and individually and simultaneously registering with said viewing apertures, and motor means adapted to be continuously energized from said source during operation of the welding system and connected to drive said shutter.

18. A mask for use with an electric arc-welding system energized from a source of periodic current comprising, an opaque shielding member having a viewing aperture, a shutter disposed inside said shielding member and having an aperture registerable with said viewing aperture, motor means adapted to be energized from said source and connected to drive said shutter, and a guard member disposed between said shutter and the face of the operator and having an aperture registering with said viewing aperture.

19. A mask for use with an electric arc-welding system energized from a source of periodic current comprising, an opaque shielding member including a supporting plate having a pair of viewing apertures, a shutter within said masking member having an aperture periodically registrable with said viewing apertures, synchronous motor means within the shielding member mounted on said plate and located in a line between the viewing apertures therein and adapted to be energized from said source and connected to drive said shutter, and means accessible exteriorly of the shielding member for adjusting the phase of the shutter motion with respect to the phase of the potential of the source during running of the motor.

20. A mask for use with an electric arc-welding system energized from a source of current comprising, an opaque shielding member having a viewing aperture, a cylindrical drum shutter in said shielding member having a pair of diametrically opposed peripheral apertures of unequal size registrable with said viewing aperture in the shielding member whereby the arc may be viewed and exposure thereto be constantly limited, motor means within said shielding member adapted to be energized from said source and connected to drive said shutter.

LEON DEWAN.

REFERENCES CITED

The following references are of record in the file of this patent:

UNITED STATES PATENTS

| Number | Name | Date |
|---|---|---|
| 432,728 | Eliel | July 22, 1890 |
| 1,497,012 | Goodspeed | June 10, 1924 |
| 2,084,681 | Grun | June 22, 1937 |
| 2,273,512 | Caldwell et al. | Feb. 17, 1942 |
| 2,384,260 | Goldsmith | Sept. 4, 1945 |